(12) United States Patent
Chung et al.

(10) Patent No.: US 7,909,494 B2
(45) Date of Patent: Mar. 22, 2011

(54) SIDE DIRECTIONAL SIGNAL FOR VEHICLE

(75) Inventors: Yao-Te Chung, Tainan (TW); Kun Yeh Lin, Tainan (TW)

(73) Assignee: Min Hsiang Corporation, Tainan Hsien (TW)

( * ) Notice: Subject to any disclaimer, the term of this patent is extended or adjusted under 35 U.S.C. 154(b) by 323 days.

(21) Appl. No.: 12/256,435

(22) Filed: Oct. 22, 2008

(65) Prior Publication Data

US 2010/0097818 A1    Apr. 22, 2010

(51) Int. Cl.
*F21S 8/10* (2006.01)
*F21V 5/00* (2006.01)
(52) U.S. Cl. ......... 362/545; 362/487; 362/509; 362/522
(58) Field of Classification Search .................. 362/487, 362/498, 505, 509, 520–522, 543–545
See application file for complete search history.

(56) References Cited

U.S. PATENT DOCUMENTS

| 6,948,838 B2 * | 9/2005 | Kunstler | 362/545 |
| 7,055,996 B2 * | 6/2006 | Pond et al. | 362/498 |

\* cited by examiner

*Primary Examiner* — Jason Moon Han
*Assistant Examiner* — Sean P Gramling

(57) ABSTRACT

A side directional signal includes a base and a cover that together define a compartment receiving a circuit board on which first and second groups of light-emitting diodes (LEDs) are mounted. Mounted between the LEDs and the cover is a light-guiding plate including an inner face with a plurality of semispheres aligned with the LEDs. The light-guiding plate further includes an outer face with grooves. A portion of the semispheres concentrates the light beams emitted from the first group of LEDs to provide enhanced brightness. The concentrated light beams transmit through the outer face and then the cover after being reflected by sidewalls of the grooves. A reflective plate is mounted between the first and second groups of LEDs. The light beams emitted from the second group of LEDs are concentrated by a remaining portion of the semispheres, reflected by the reflective plate, and transmitted through the cover.

2 Claims, 7 Drawing Sheets

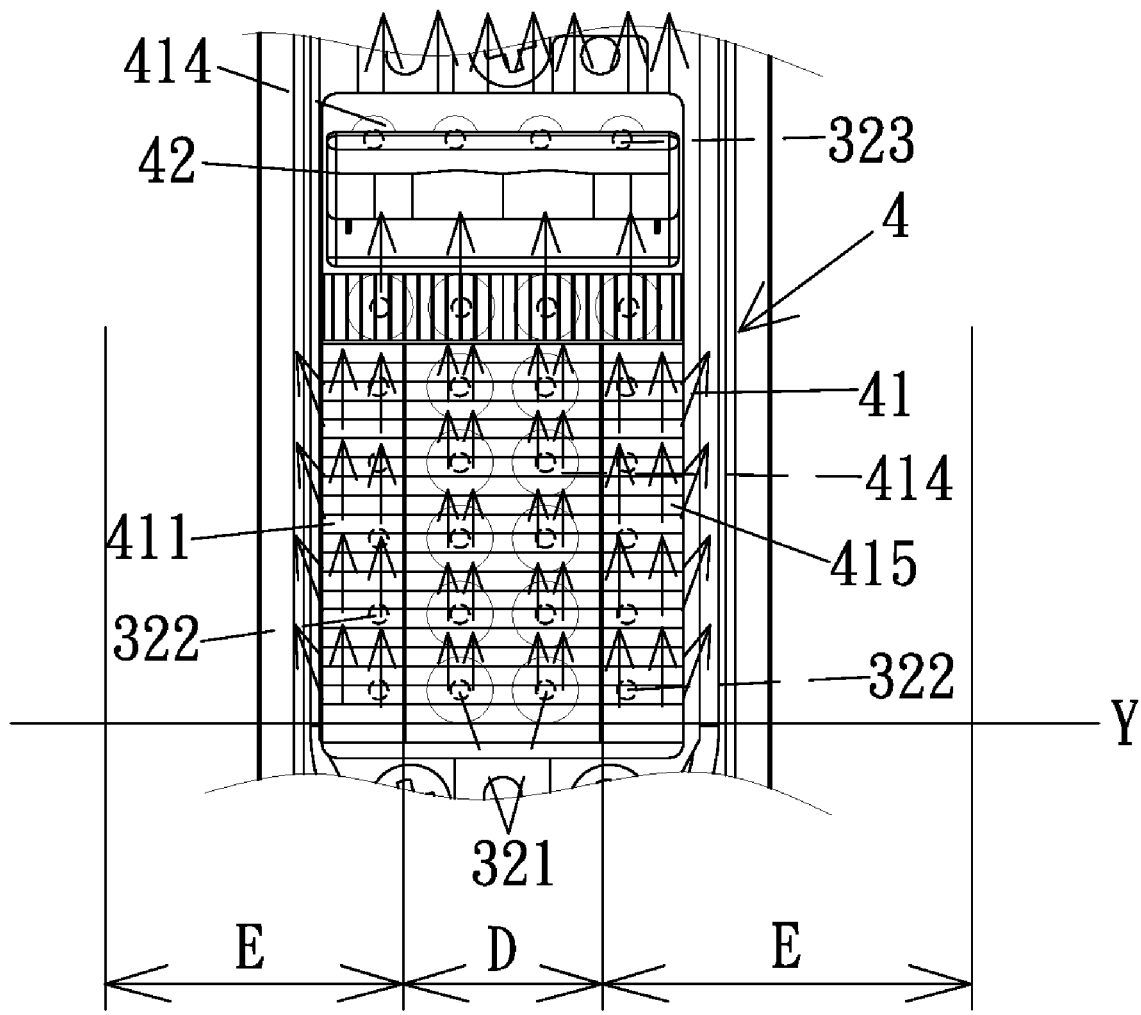
F I G . 5

SIDE DIRECTIONAL SIGNAL FOR VEHICLE

BACKGROUND OF THE INVENTION

1. Field of the Invention

The present invention relates to a side directional signal and, more particularly, to a side directional signal for a vehicle that project light beams emitted by a plurality of light-emitting diodes to a predetermined angle and that provides a larger illumination area.

2. Description of the Related Art

To enhance safety, a large vehicle often includes side directional signals at two sides of the vehicle to indicate the moving direction of the vehicle. FIG. 7 shows a conventional side directional signal including a base 1' having a compartment 11' in which a lighting device 3' is mounted. A light-transmittable cover 2' is mounted above the compartment 11'. The lighting device 3' includes a circuit board 31' and a plurality of light-emitting diodes (LEDs) 32' on the circuit board 31'. The circuit board 31' is electrically connected to a power source of the vehicle to control the LEDs 32' to emit light beams that are transmitted through cover 2'.

However, the light beams emitted by the individual LEDs 32' are dot-like and independent from each other after passing through the cover 2'. Namely, the cover 2' can not concentrate the light beams. Furthermore, the cover 2' can not project the light beams to a desired angle.

BRIEF SUMMARY OF THE INVENTION

A side directional signal according to the preferred teachings of the present invention includes a base adapted to be mounted to a side of a vehicle. A cover made of transparent material is mounted to the base. The cover and the base together define a compartment. A lighting device is mounted in the compartment and includes a circuit board and a plurality of light-emitting diodes mounted on the circuit board and facing the cover. The circuit board control lighting of the light-emitting diodes to emit light beams toward the cover. The light-emitting diodes include a first group and a second group. A light-guiding module includes a light-guiding plate mounted between the light-emitting diodes and the cover. The light-guiding plate includes an inner face facing and spaced from the light-emitting diodes. The inner face includes a plurality of semi spheres aligned with the light-emitting diodes. The light-guiding plate further includes an outer face facing the cover. The outer face includes a plurality of grooves having sidewalls. A portion of the semispheres concentrates the light beams emitted from the first group of light-emitting diodes to provide enhanced brightness. The concentrated light beams transmit through the outer face of the light-guiding plate and are reflected by the sidewalls of the grooves to a direction having an angle with the light-guiding plate. The light beams reflected by the sidewalls of the grooves transmit through the cover. The light-guiding module further includes a reflective plate having a reflective face. The reflective plate is intermediate the first and second groups of light-emitting diodes. The light beams emitted from the second group of light-emitting diodes are concentrated by a remaining portion of the semispheres, reflected by the reflective face, and transmitted through the cover.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 5 shows a, partial, top view of the side directional signal of FIG. 1, illustrating illumination of a lighting device of the side directional signal.

Figure 1:
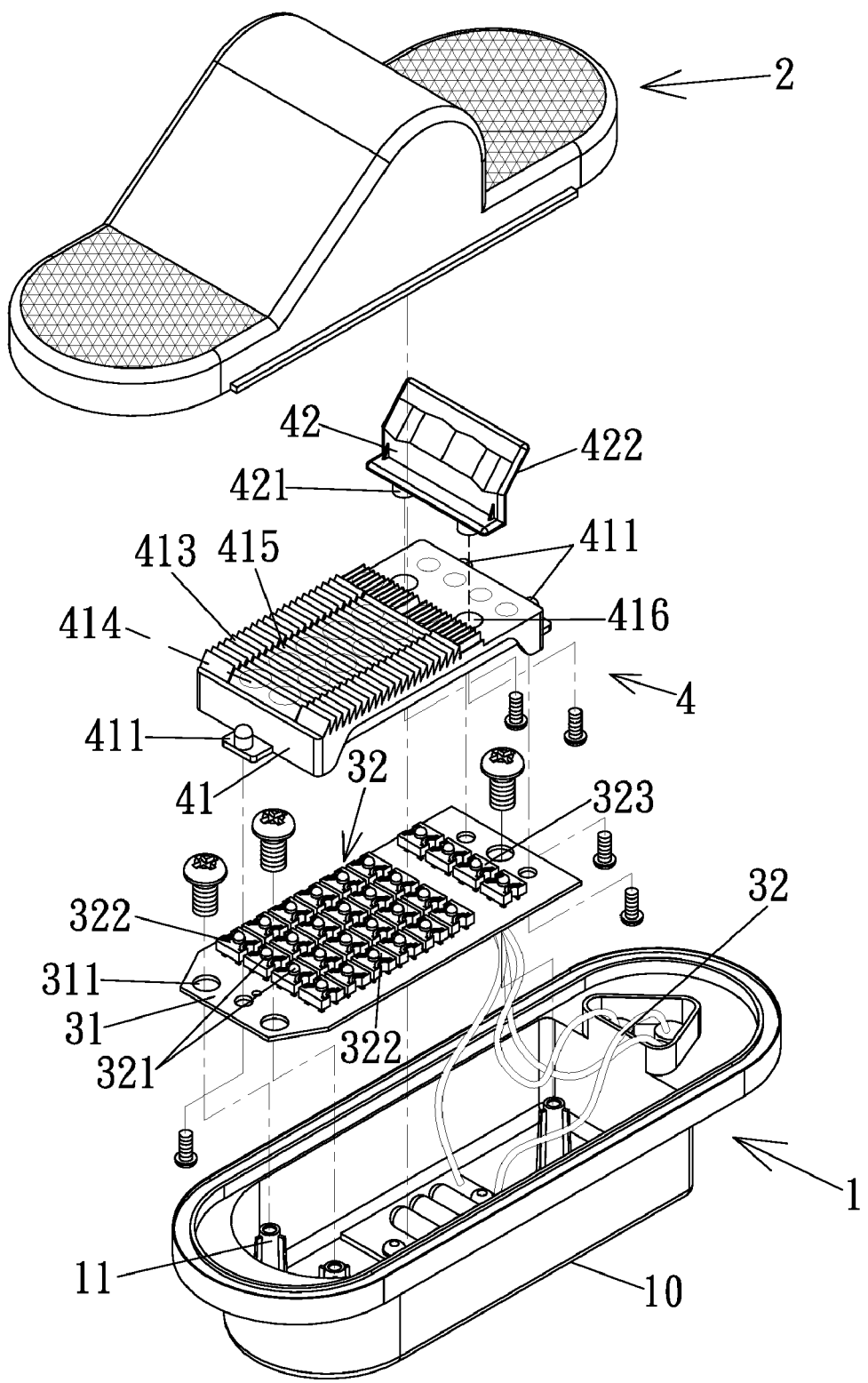
FIG. 1 shows an exploded, perspective view of a side directional signal for a vehicle according to the preferred teachings of the present invention.
Figure 2:
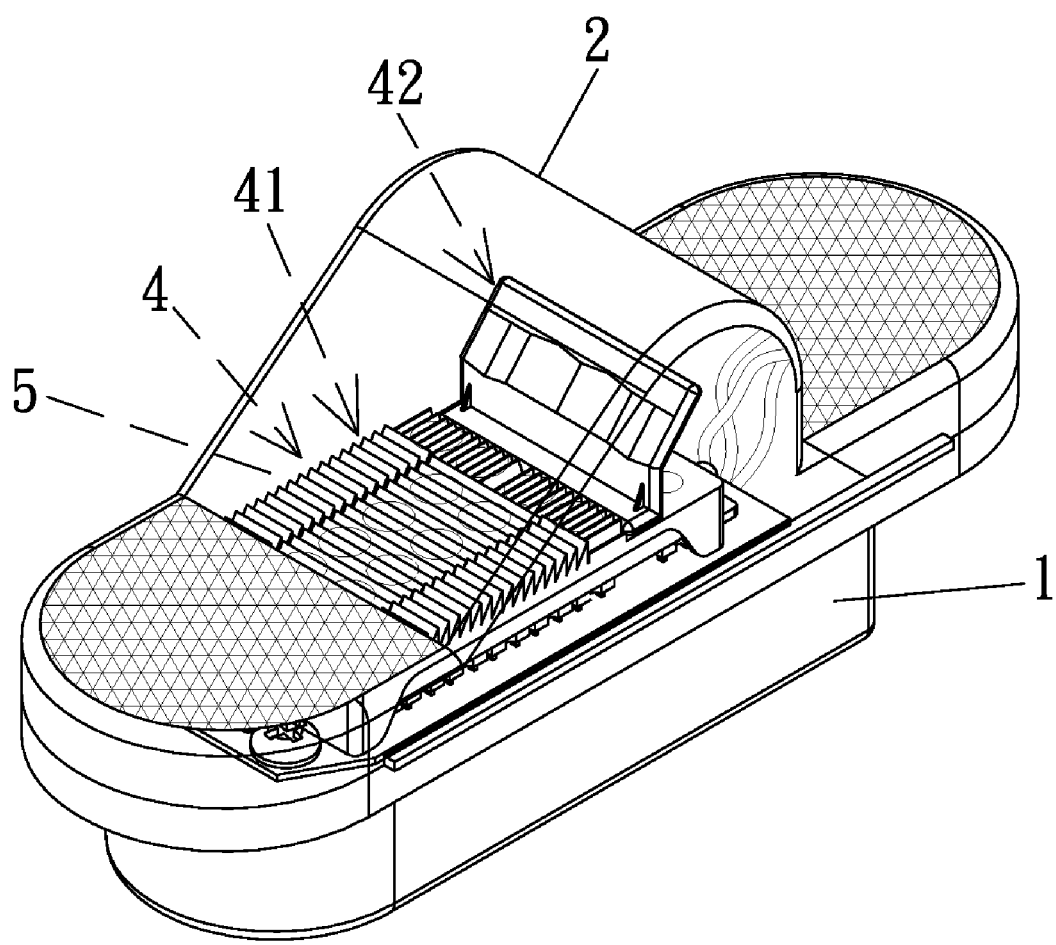
FIG. 2 shows a perspective view of the side directional signal of FIG. 1.
Figure 3:
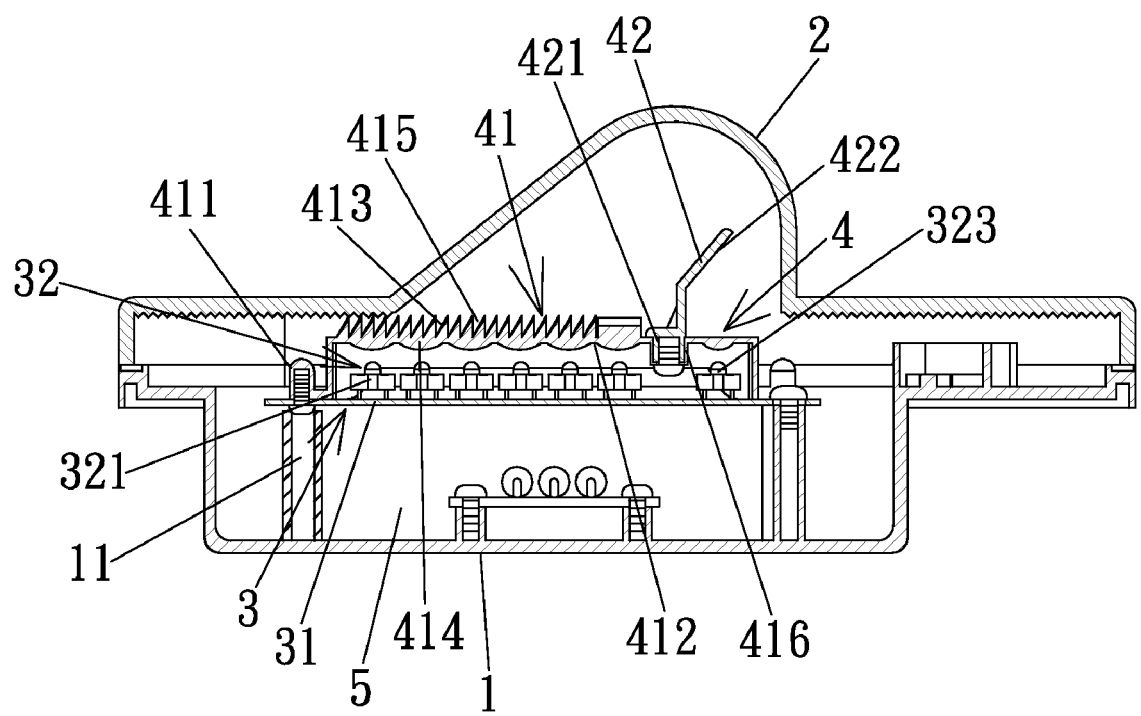
FIG. 3 shows a cross sectional view of the side directional signal of FIG. 1.
Figure 4:
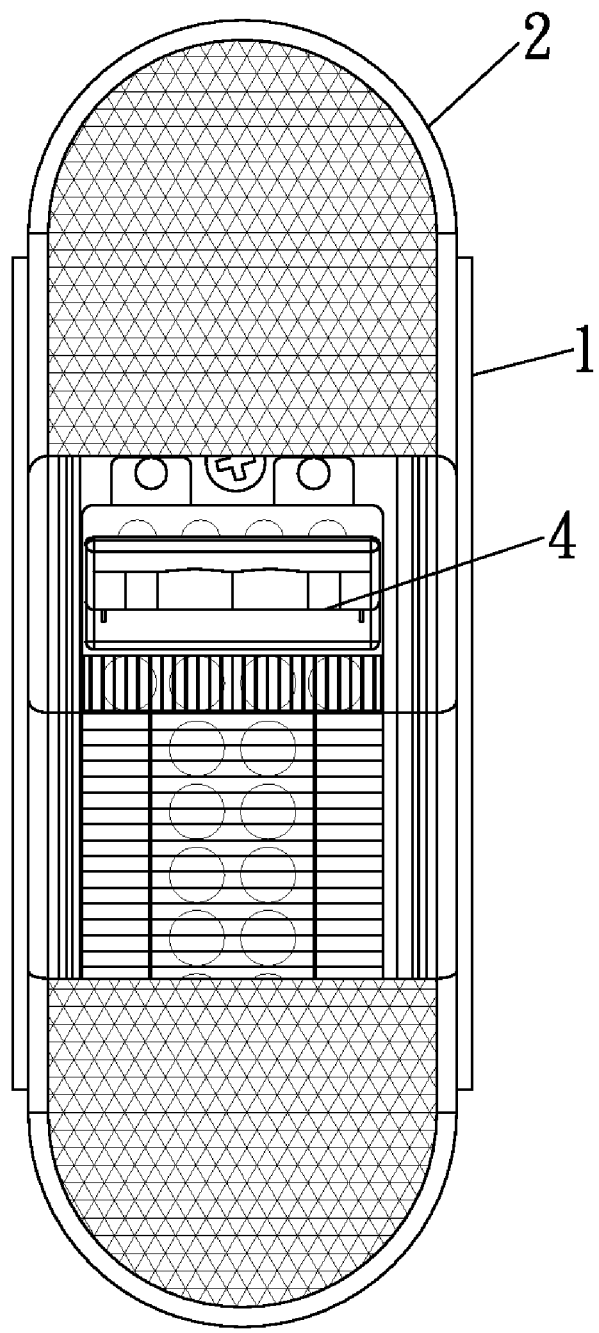
FIG. 4 shows a top view of the side directional signal of FIG. 1.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

A side directional signal for a vehicle according to the preferred teachings of the present invention is shown in the drawings and generally includes a base 1, a cover 2, a lighting device 3, and a light-guiding module 4. The base 1 is adapted to be mounted to a side of a vehicle and includes a plurality of engaging holes 11. The cover 2 is made of transparent material and mounted above the base 1. The cover 2 and the base 1 together define a compartment 5.

The lighting device 3 is mounted in the compartment 5 and includes a circuit board 31 connected by wires 32 to an external power source. The circuit board 31 includes a plurality of fixing holes 311. Fasteners are extended through the fixing holes 311 into the engaging holes 11 to fix the circuit board 31 in the compartment 5. A plurality of light-emitting diodes (LEDs) 32 are mounted on the circuit board 31 and face the cover 2. The circuit board 31 controls lighting of the light-emitting diodes 32 to emit light beams toward the cover 2. The light-emitting diodes 32 include a first group and a second group 323 spaced from the first group. Furthermore, the first group includes a central group 321 and two outer groups 322 on opposite sides 321 of the central group 321.

The light-guiding module 4 includes a light-guiding plate 41 mounted between the light-emitting diodes 32 and the cover 2. The light-guiding plate 41 includes a plurality of engaging holes 411 for coupling with the circuit board 31 by fasteners. The light-guiding plate 41 includes an inner face 412 facing and spaced from the light-emitting diodes 32. The inner face 412 includes a plurality of semispheres 414 aligned with the central group 321 of light-emitting diodes 32 and the second group 323 of light-emitting diodes 32. The light-guiding plate 41 further includes an outer face 413 facing the cover 2. The outer face 413 includes a plurality of substantially V-shaped grooves 415 having sidewalls. The light-guiding module 4 further includes a reflective plate 42 having a reflective face 422. The reflective plate 42 is intermediate the second group 323 of light-emitting diodes 32 and the first group of light-emitting diodes 32. The reflective plate 42 includes a plurality of pegs 421 inserted into holes 416 in the light-guiding plate 41, and screws are then extended into screw holes of pegs 421 to fix the reflective plate 42 on the light-guiding plate 41 with the reflective face 422 facing the second group 323 of light-emitting diodes 32 and at an acute angle with the light-guiding plate 41.

Figure 6:
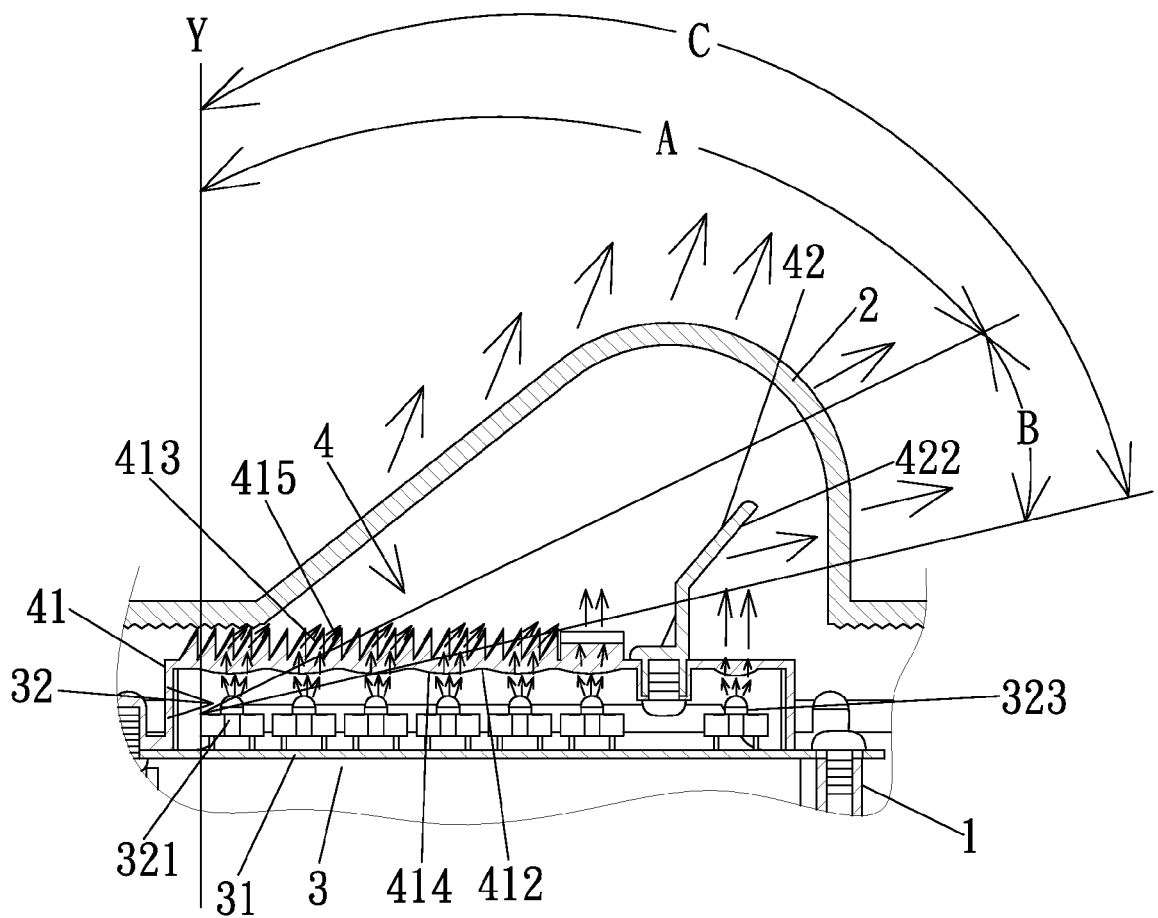
FIG. 6 shows a partial, cross sectional view of the side directional signal of FIG. 1, illustrating illumination of the lighting device of the side directional signal.
Figure 7:
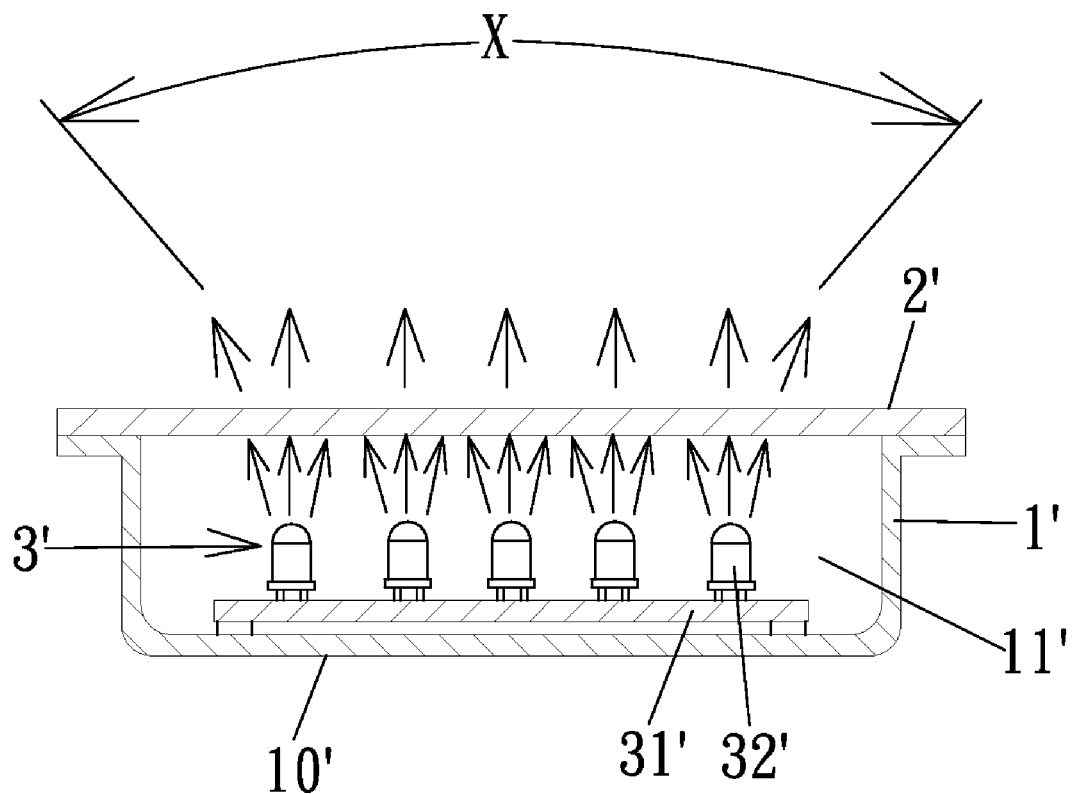
FIG. 7 shows a cross sectional view of a conventional side directional signal for a vehicle.

With reference to FIGS. 5 and 6, the semispheres 414 aligned with the central group 321 of light-emitting diodes 32 concentrate the light beams emitted from the central group 321 of light-emitting diodes 32 to provide enhanced brightness (see area D in FIG. 5). The concentrated light beams transmit through the outer face 413 of the light-guiding plate 41 and reflected by the sidewalls of the grooves 415 to a direction having an angle with the light-guiding plate 41. Then, the light beams reflected by the sidewalls of the grooves 415 transmit through the cover 2. The light beams emitted by the outer groups 322 of light-emitting diodes 32 directly emit through the cover 2 to provide a diffusion effect (see areas E in FIG. 5). Note that the light beams emitted from light-emitting diodes 321 and 322 cover an angle A (FIG. 6) with respect to a vertical plane Y perpendicular to the circuit board 31 and behind the light-emitting diodes 32.

Furthermore, the light beams emitted from the second group 323 of light-emitting diodes 32 are concentrated by the remaining portion of the semispheres 411. Then, the light beams are reflected by the reflective face 422 and transmitted through the cover 2. Note that the light beams reflected by the reflective face 422 cover an angle B (FIG. 6) with respect to the vertical plane Y. It is noted that the reflective angle between the light-guiding plate 41 and the light beams reflected by the reflective face 422 is smaller than the reflective angle between the light-guiding plate 41 and the light beams reflected by the sidewalls of the grooves 415.

Since the light beams emitted from the central group 321 of light-emitting diodes 32 are concentrated by the light-guiding module 4 to obtain enhanced brightness, low-power light-emitting diodes 32 can be utilized to obtain the brightness required. Furthermore, the outer groups 322 of light-emitting diodes 32 provides a light diffusion effect while the central group 321 of the light-emitting diodes 32 provide a brighter area, a block of light source is, thus, provided, obtaining better alarming effect. Furthermore, the reflective plate 42 provides an additional angle of illumination, so that the overall angle C of illumination is larger, further enhancing the alarming effect.

The side directional signal according to the preferred teachings of the present invention can include a plurality of light-guiding modules 4 with different reflective angles to meet various needs.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A side directional signal for a vehicle comprising, in combination: a base adapted to be mounted to a side of a vehicle; a cover made of transparent material and mounted to the base, with the cover and the base together defining a compartment; a lighting device mounted in the compartment and including a circuit board and a plurality of light-emitting diodes mounted on the circuit board and facing the cover, with the circuit board controlling lighting of the plurality of light-emitting diodes to emit light beams toward the cover, with the plurality of light-emitting diodes including a first group and a second group; and a light-guiding module including a light-guiding plate mounted between the plurality of light-emitting diodes and the cover, with the light-guiding plate including an inner face facing and spaced from the plurality of light-emitting diodes, with the inner face including a plurality of semispheres aligned with the plurality of the light-emitting diodes, with the light-guiding plate further including an outer face facing the cover, with the outer face including a plurality of grooves having sidewalls, with a portion of the plurality of semispheres concentrating the light beams emitted from the first group of the plurality of light-emitting diodes to provide enhanced brightness, with the concentrated light beams transmitting through the outer face of the light-guiding plate and reflected by the sidewalls of the plurality of grooves to a direction having an angle with the light-guiding plate, with the light beams reflected by the sidewalls of the plurality of grooves transmitting through the cover, with the light-guiding module further including a reflective plate having a reflective face, with the reflective plate intermediate the first and second groups of the plurality of light-emitting diodes, with the light beams emitted from the second group of the plurality of light-emitting diodes being concentrated by a remaining portion of the plurality of semispheres, reflected by the reflective face, and transmitted through the cover, with the first group of the plurality of light-emitting diodes including a central group and two outer groups on opposite sides of the central group, with a portion of the plurality of semispheres aligned with the central group, and with the remaining portion of semispheres aligned with the second group of the plurality of light-emitting diodes.

2. The side direction signal as claimed in claim 1, with a reflective angle between the light-guiding plate and the light beams reflected by the reflective face and being smaller than a reflective angle between the light-guiding plate and the light beams reflected by the sidewalls of the plurality of grooves.

* * * * *